Nov. 3, 1959 — J. J. BISHOP — 2,910,781
DIAL HOLE GAUGE
Filed March 29, 1957 — 2 Sheets-Sheet 1
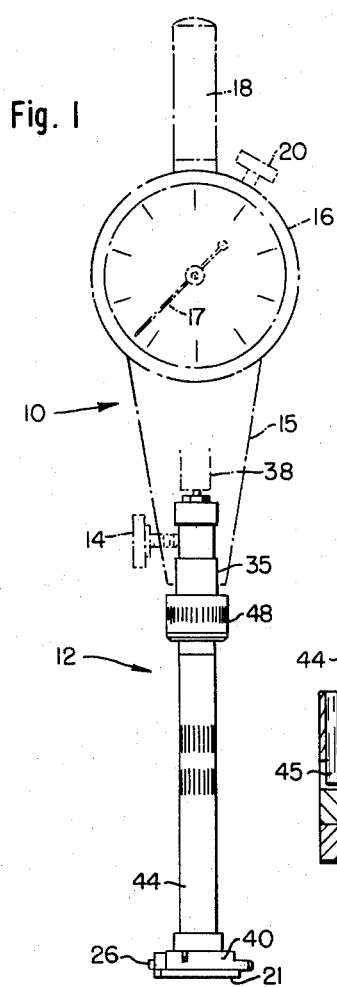
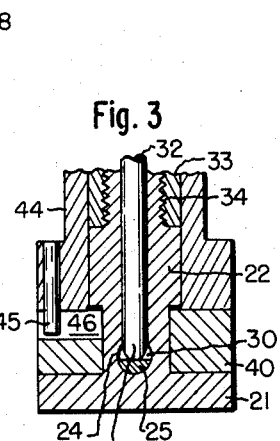
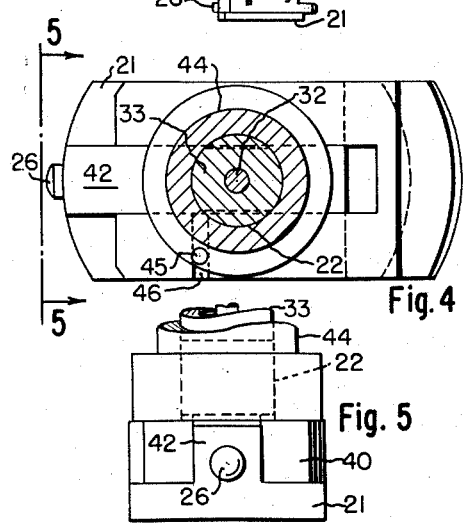
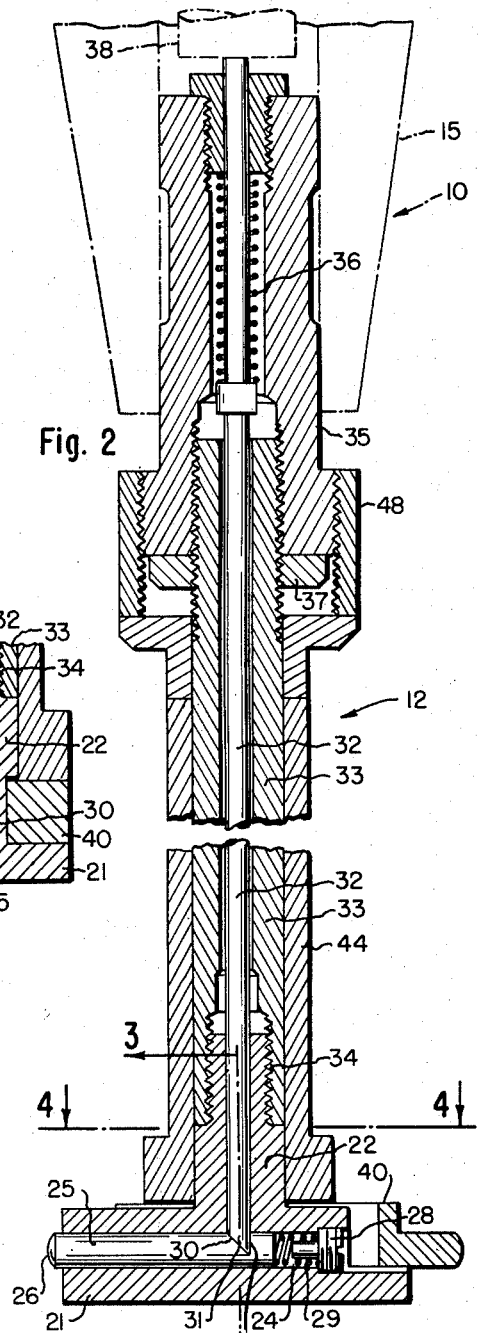
INVENTOR.
JOHN J. BISHOP
BY
ATTORNEYS Nov. 3, 1959  J. J. BISHOP  2,910,781
DIAL HOLE GAUGE Filed March 29, 1957  2 Sheets-Sheet 2

INVENTOR
JOHN J. BISHOP

BY

ATTORNEYS

United States Patent Office 2,910,781
Patented Nov. 3, 1959

2,910,781

DIAL HOLE GAUGE

John J. Bishop, Templeton, Mass., assignor to The L. S. Starrett Company, Athol, Mass., a corporation of Massachusetts Application March 29, 1957, Serial No. 649,335

6 Claims. (Cl. 33—178)

This invention relates to a gauge for measuring or comparing to fine and accurate dimensions the inside diameter of a hole or bore. The measurement is indicated on a dial and such gauges are commonly called dial hole or bore gauges. The gauge embodies a gauging head adapted to be inserted in the bore and carries aligned and opposed contacts embodying a fixed contact and a movable contact, the inward movement of the latter being adapted to register on the dial. Accurate measurement requires that the aligned contacts shall be centered on the true diameter of the hole being gauged and centralizing plungers disposed at opposite sides of the movable contact are ordinarily provided for this purpose on such gauges. My invention contemplates an improved self-centering gauge in which these plungers are eliminated.

My improved gauge embodies a gauging head having a movable contact therein, and mounted on the head in alignment with the movable contact is a range bar providing the fixed contact at the outer end of the bar. The bar is adjustable on the head through a predetermined range and can be set to the exact diameter reading required of the hole to be gauged. The fixed contact end of the bar is furthermore provided with means integral therewith for centering the gauging head in the hole. In the preferred form of the invention this means embodies convex work contacting surfaces at the said outer end of the range bar constructed to provide a three-point work contact for centering the gauge on the true diameter of the hole when the gauge is slightly rocked sidewise therein and providing a two-point contact on the true diameter when the gauge is brought to gauging position perpendicular to the hole axis. The production of a new and improved gauge of this nature and for the purpose described comprises the primary object of the invention.

Further features of the invention relate to novel and compact means for conveniently adjusting the range bar to the size of the hole to be gauged and to improved means for mounting and supporting the said movable contact together with resilient means for normally maintaining it in extended work gauging position.

These and other features of the invention will be best understood and appreciated from the following description of a preferred embodiment thereof selected for purposes of illustration and shown in the accompanying drawings in which—

Figure 11:
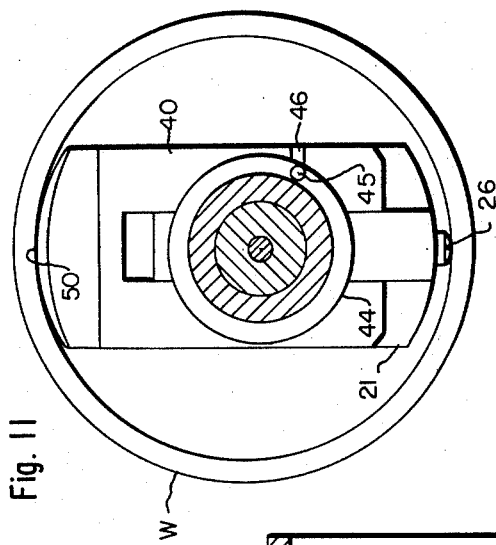
Figure 10:
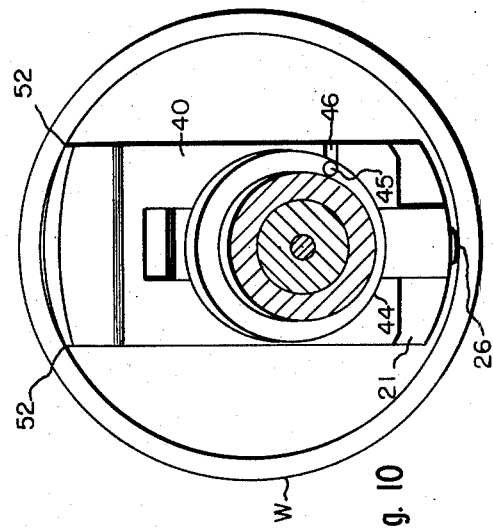
Figure 9:
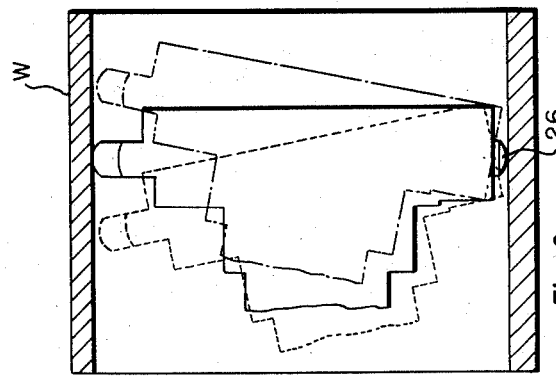
Figure 8:
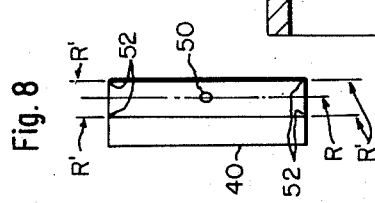
Figure 7:
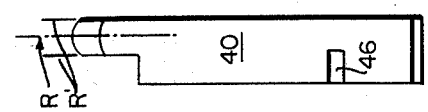
Figure 6:
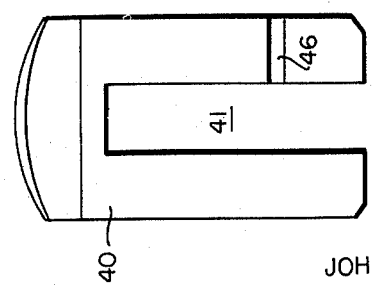

Fig. 1 is a front elevation of a gauge unit embodying the invention, and illustrating in broken lines a dial head used therewith, Fig. 2 is an enlarged longitudinal sectional view through the gauge unit, Fig. 3 is a fragmentary sectional view taken on line 3—3 of Fig. 2, Fig. 4 is a sectional view taken on line 4—4 of Fig. 2, Fig. 5 is an end view taken on line 5—5 of Fig. 4, Fig. 6 is a plan view of a range bar shown in Fig. 4, Fig. 7 is an edge view of the bar, Fig. 8 is a front end view of the bar, Fig. 9 is a longitudinal sectional view through a work piece being gauged and illustrating the gauging operation, Fig. 10 is a cross sectional view illustrating the gauge in centralizing position, and Fig. 11 is a like view of the gauge in gauging position.

In the drawings 10 indicates a dial head adapted to receive and cooperate with a gauge unit 12, a set screw 14 being provided for securing the unit within and to the head. Each dial head is adapted selectively to receive a plurality of units each constructed to gauge holes within a predetermined diameter range. The dial head comprises a body 15 supporting a dial 16 and an indicator 17 and having a handle 18. The dial is rotatably adjustable and is secured in adjusted position by a clamping screw 20.

The gauge unit 12 comprises an oblong measuring head 21 having a stem 22 integral therewith and extending right-angularly from and intermediately of the ends of the head. A bore 24 extends longitudinally and centrally through the head and slidably receives thereinto a plunger 25 having a work contacting end 26 extending outwardly of its forward end. The other end of the bore is threaded to receive a plug 28 for confining a compression spring 29 between the plug and the rear end of the plunger. The plunger 25 is notched at 30 to receive the beveled end 31 of a plunger 32 disposed centrally through the stem 22 and through a tube 33 threaded to the stem at 34.

A tubular stem 35 threaded to and carried by the tube 33 contains a compression spring 36 on and normally forcing the plunger 32 forwardly into contact with the plunger 25 and is secured by a lock nut 37. The plunger 32 retains the plunger 25 in the head 21 and the spring 29 resiliently maintains the plunger 25 in the foremost position permitted by the plunger 32, thus relieving the spring 36 of this function and rendering the gauge more sensitive. Rearward movement of the plunger 25 is adapted to function through the bevel contact at 31 to force the plunger 32 rearwardly and against the dial operating plunger 38. Such movement of the plunger 25 can force the plunger 32 entirely out of the notch 30, thereby permitting further rearward movement of the plunger 25 against the spring 29 without further moving the plunger 32, thus serving as a safety feature preventing damage to the indicator mechanism by any undue pressure on the plunger 32. Particular attention is directed to the plane rear wall 39 of the notch 30 disposed right-angularly to the axis of plunger 25 and adapted to be engaged by the plunger 32 and provide a positive stop limiting forward movement of the plunger 25.

An oblong range bar 40 is slotted centrally at 41 to receive and slide longitudinally on a reduced top portion 42 of the head 21. A sleeve 44 rotatably mounted on the stem 22 and tube 33 carries an eccentrically mounted pin 45 extending into a transverse slot 46 in the bar, the diameter of the pin corresponding to the width of the slot. The sleeve is normally held against rotation and in contact with the range bar by a sleeve lock nut 48 threaded to the tubular stem 35. The range bar can be conveniently adjusted on the head 21 by releasing the lock nut 48 and rotating the sleeve 44.

The forward end of the range bar 40 provides the fixed contact of the head cooperating with the movable contact 26. This end of the bar is arcuately curved convexly from edge to edge of the bar (Fig. 6) and also transversely thereof from face to face of the bar (Fig. 7) and the radius of the curvature R through the center of the bar (Fig. 8) is a few thousandths of an inch less than the radius of the minimum bore that can be gauged by the bar. This relationship and the functions served are illustrated in Figs. 9–11 and hereinafter described.

It should be understood that the gauge unit 12 employed and also the range bar 40 used thereon for gauging a hole must include the hole diameter within their range.

The gauge is especially adapted for use in measuring holes ranging from .185" to 3.00" in diameter and a gauge set adapted to serve this range will ordinarily embody (1) one dial head 10, (2) four gauge units 12 and (3) three or four range bars for each unit. The following units and range bars are indicated as adapted to measure holes ranging from .185" to 3.031" in diameter.

| | |
|---|---|
| No. 1 Unit range | range .185 to .390 |
| No. 1 Bar | .185 to .263 |
| No. 2 Bar | .250 to .328 |
| No. 3 Bar | .312 to .390 |
| No. 2 Unit | range .375 to .757 |
| No. 1 Bar | .375 to .507 |
| No. 2 Bar | .500 to .632 |
| No. 3 Bar | .625 to .757 |
| No. 3 Unit | range .750 to 1.531 |
| No. 1 Bar | .750 to 1.031 |
| No. 2 Bar | 1.015 to 1.269 |
| No. 3 Bar | 1.281 to 1.531 |
| No. 4 Unit | range 1.500 to 3.031 |
| No. 1 Bar | 1.500 to 1.906 |
| No. 2 Bar | 1.875 to 2,281 |
| No. 3 Bar | 2.250 to 2.656 |
| No. 4 Bar | 2,625 to 3.031 |

Any one of the four units 12 can be assembled with the dial head 10 and secured thereto by the clamp screw 14. The range bar 40 can be freely removed from and placed on the head 21 by backing off the lock nut 48 and withdrawing the sleeve 44 to withdraw the pin 45 from the slot 46. In using the gauge the first step is to select and assemble with the dial head 10 the unit 12 and range bar 40 that include the diameter of the hole to be gauged. The gauge is then set to a master by adjusting the range bar to the diameter of the hole it is desired to produce, it being understood that the gauge is primarily used as a comparator in machining operations to produce holes having exact and true measurements. The parts are then firmly locked in this adjusted position by the lock nut 48 and the dial 16 is set with the indicator 17 at zero.

The gauging operation is performed by inserting the gauging head into the hole and slightly rocking the head sidewise on the contact 26 as illustrated in Fig. 9, the purpose of this motion being to center the head on the true diameter of the hole. By reference to Figs. 2, 8, 10 and 11 it will be apparent that the highest spot 50 on the free end of the range bar 40 is in alignment with the plunger 25 and its work contacting end 26 and, when the head is rocked as illustrated in Fig. 9 the spots 52 at the ends of the arcs R' come into contact with the work. Thus each pair of contacts 52, at opposite sides of the plane at R, cooperates with the contact 26 to provide a three-point contact wih the work W and thus center the head on the true diameter of the hole. When thus rocked the head is centered on the true diameter and as it reaches the mid-position the two contacts 26 and 50 are in measuring contact with the work on its true diameter and register this true diameter reading on the dial 16. As will be apparent, the work contacting spots 52 are disposed rearwardly of the spot 50 and thus remain out of contact with the work except when the gauge is rocked to one of the two tilted positions shown in broken lines in Fig. 9.

It will now be apparent that I have produced a new and improved self-centering gauge of the nature described whereby the diameter of bores can be quickly and accurately measured to fine dimensions. The gauge embodies a minimum number of relatively simple and economical parts and a minimum number of unit pieces of varying range that can be readily assembled to measure bores varying widely in diameter. The means for adjusting the fixed contact is convenient and quick and, together with the spring operated movable contact and the cooperating stem plunger disposed to engage the movable contact plunger, provides a highly sensitive and accurate gauge for the purpose described.

Having thus disclosed my invention what I claim as new and desire to secure by Letters Patent is—

1. In a dial hole gauge, a measuring head, a supporting stem rigidly affixed to the head and extending right angularly therefrom, index operating mechanism including a member slidably mounted in the head and having a work contacting point projecting outwardly therefrom radially of the stem, a range bar mounted on and parallel with the head and having a work contacting end projecting radially of the stem outwardly beyond the head in opposed relation to said work contacting point at the opposite side of the stem, means for adjusting the bar longitudinally on the head radially of the stem, means for securing the bar in adjusted position, and means integral with the bar at said work contacting end for centering the bar and said work contacting point diametrically within a hole to be gauged.

2. The combination defined in claim 1 in which said means for adjusting the range bar comprises a sleeve rotatably mounted coaxially on said stem and carrying eccentrically mounted means engaging the bar.

3. The combination defined in claim 1 in which the range bar is partly rectangular in cross section and centrally slotted longitudinally to receive and slide longitudinally on the head and said work contacting end is arcuately curved convexly from edge to edge of the bar and also transversely thereof from face to face of the bar.

4. In a dial hole gauge, an oblong measuring head, a supporting stem rigidly affixed to the head intermediately of its ends and extending right angular therefrom, the head and stem having bores disposed longitudinally therein and intersecting in the head, a plunger slidably mounted in the head bore and having a forward work contacting end projecting outwardly therefrom, a plunger slidably mounted in the stem bore and having its forward end engaging within a V-shaped notch within and intermediately of the ends of the head plunger, the plungers having co-engaging bevels within the notch disposed to move the stem plunger rearwardly upon rearward movement of the head plunger and the notch having a plane rear wall disposed right-angularly to the axis of the head plunger and adapted to be engaged by the rear side wall of the beveled end of the stem plunger and provide a positive stop limiting forward movement of the head plunger, a spring in the head bore rearwardly of its plunger and normally forcing the plunger forwardly to the limit permitted by the stem plunger, and a spring normally forcing the stem plunger forwardly into contact with the head plunger.

5. In a dial hole gauge, an oblong gauging head, a member slidably mounted longitudinally and centrally in the head and having a work contacting end projecting outwardly from one end thereof, an oblong bar on and parallel with the head and having a work contacting end projecting outwardly beyond the other end of the head and carrying integral on its extreme end a work contacting spot in alignment with said member and its work contacting end, means for adjusting the bar longitudinally on the head, means for securing the bar in adjusted position, and two pairs of work contacting spots on said end of the bar, the two spots of each pair being disposed rearwardly and at opposite sides of the first named spot and the pairs being spaced respectively from opposite sides of a plane disposed in and parallel with the longitudinal axis of said member and between said pairs.

6. In a dial hole gauge, a measuring head, a supporting stem rigidly affixed to the head and extending right angularly therefrom, index operating mechanism including a member slidably mounted in the head and having a work contacting point projecting outwardly therefrom radially of the stem, a range bar mounted on and parallel with the head and having a work contacting end projecting radially of the stem outwardly beyond the head in opposed relation to said work contacting point at the opposite side of the stem, means comprising a sleeve rotatably mounted coaxially on said stem and carrying eccentrically mounted means engaging the bar for adjusting the bar longitudinally on the head radially of the stem, a lock nut threaded to the stem and cooperating with the sleeve for securing the sleeve against rotation, and means on said work contacting end of the bar for centering the bar and said work contacting point diametrically within the hole to be gauged.

References Cited in the file of this patent
UNITED STATES PATENTS

| | | |
|---|---|---|
| 1,431,615 | Wittner | Oct. 10, 1922 |
| 2,587,099 | Bishop et al. | Feb. 26, 1952 |
| 2,702,946 | Boat | Mar. 1, 1955 |